Aug. 27, 1935.　　　R. R. HALSTEAD　　　2,012,508
GAS FILTERING DEVICE
Filed April 25, 1935　　　2 Sheets-Sheet 1
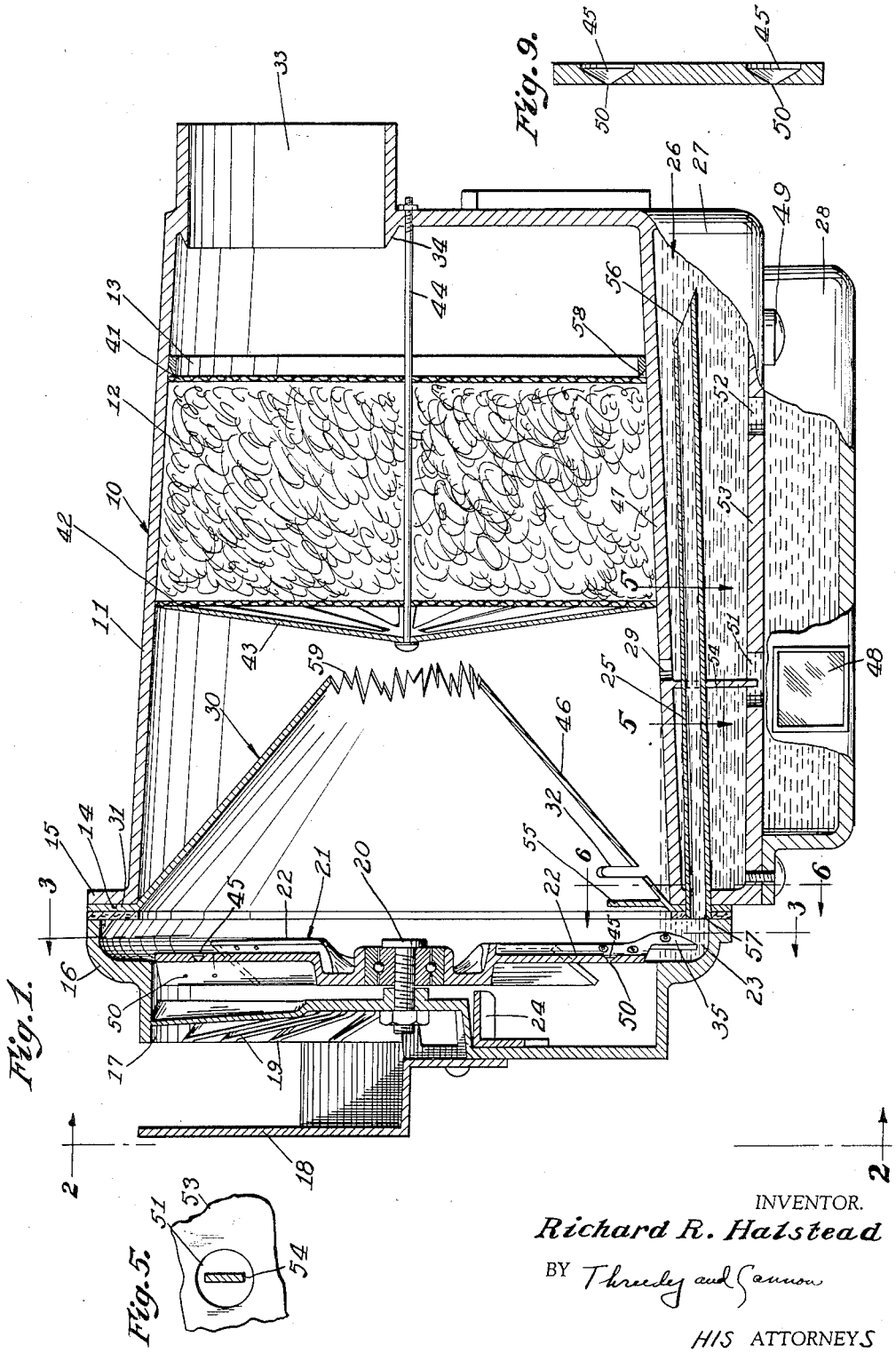
INVENTOR.
Richard R. Halstead
BY Threedy and Gannon
HIS ATTORNEYS Aug. 27, 1935. R. R. HALSTEAD 2,012,508
GAS FILTERING DEVICE
Filed April 25, 1935   2 Sheets-Sheet 2
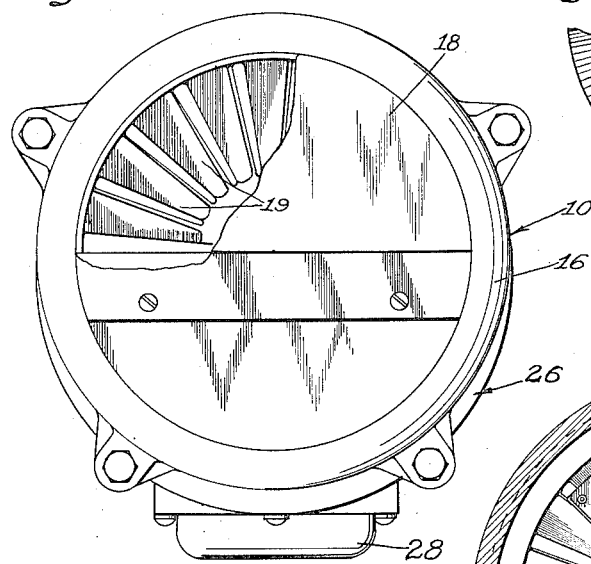
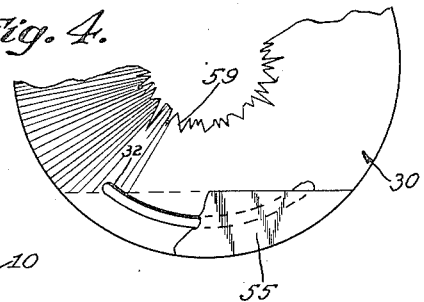
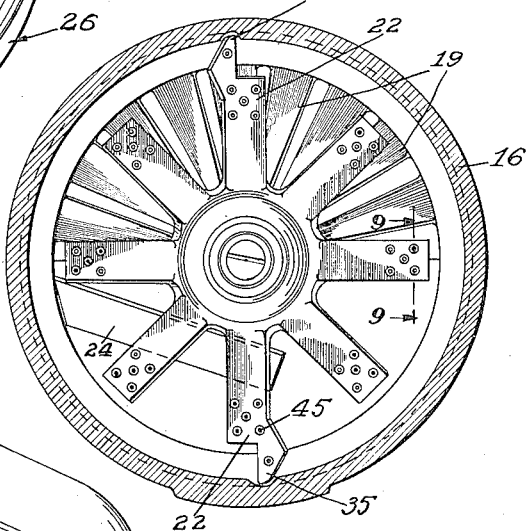
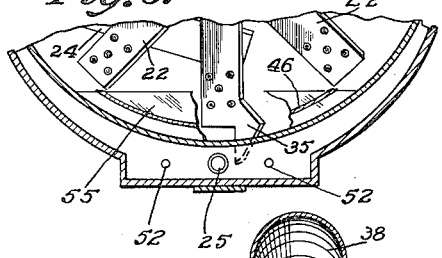
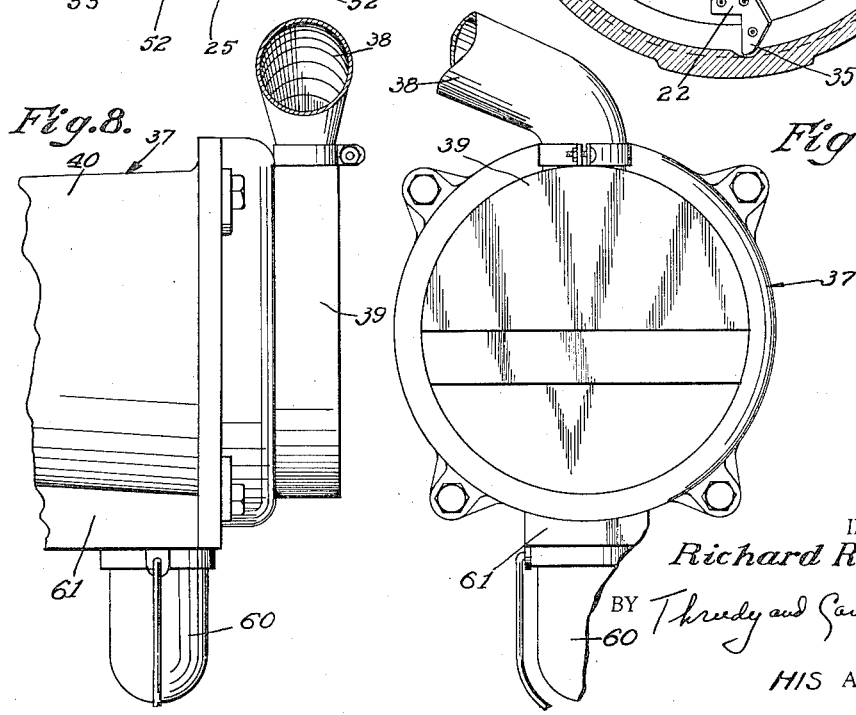
INVENTOR.
Richard R. Halstead
BY Thredy and Gannon
HIS ATTORNEYS Patented Aug. 27, 1935

2,012,508

UNITED STATES PATENT OFFICE 2,012,508

GAS FILTERING DEVICE

Richard R. Halstead, Beach, N. Dak., assignor to Halstead Corporation, Beach, N. Dak., a corporation of North Dakota Application April 25, 1935, Serial No. 18,154

8 Claims. (Cl. 183—9)

This invention relates to a gas filtering device.

It is an object of this invention to provide an improved gas filtering device which is relatively simple and inexpensive in construction and efficient in use.

The present invention has for its principal object the provision of an improved device for filtering a stream of air or other gas supplied to any device, or machine, such as, for example, to internal combustion engines, air-conditioning apparatus, and the like, wherever it may be desired to remove dust and other foreign particles from a stream of air before passing the same into the machine, device, or apparatus to which it is supplied.

Another object of the invention is to provide an air or gas filtering device which is particularly adapted for filtering the air supply to an internal combustion engine, such an air supply being frequently heavily laden with dust and dirt and other foreign particles picked up from the ground or highway over which the vehicle is traveling.

A further object of the present invention is to provide certain improvements upon the air filtering device shown in my prior Patent No. 1,948,791 granted February 27, 1934 on an Air filter and upon my copending application Serial No. 732,-157, filed June 23, 1934 on an Air cleaner.

An additional object of the present invention is to provide an improved gas filter including a housing, having a well adapted to contain a quantity of filtering liquid, and said housing being provided with an air inlet and an air outlet, a filtering element in the housing between the inlet and the outlet and a novel device arranged between the well and the filtering element for effecting an intimate mixture of the inflowing air and foreign particles carried thereby with the filtering liquid from the well prior to the time the air passes into the filter element so as to effect the removal of the greater part of the foreign particles from the air prior to the time the same enters into the filter element.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a longitudinal vertical sectional view illustrating a preferred form of the invention;

Fig. 2 is an elevational view on line 2—2 of Fig. 1, with a part of the guard plate 18 broken away to show the air intake to the filtering device;

Fig. 3 is a sectional view on line 3—3 of Fig. 1, showing the rotary liquid or oil spraying device embodied in the invention;

Fig. 4 is a fragmentary detail view of the mixing cone embodied in the device;

Fig. 5 is a sectional detail view on line 5—5 in Fig. 1;

Fig. 6 is a sectional view on line 6—6 in Fig. 1;

Fig. 7 is an end elevational view of a modified form of the invention;

Fig. 8 is a side elevational view of the modified form of the invention shown in Fig. 7; and Fig. 9 is a sectional detail view, on line 9—9 in Fig. 3, showing the recesses or pockets provided in the vanes or blades of the rotor embodied in the new air or gas filtering device.

A preferred form of the invention is shown in Figs. 1 to 6 inclusive of the drawings, is therein generally indicated at 10 and comprises a housing or casing 11 which is preferably substantially frusto-conical in construction. Arranged in the housing or casing 11 is a filtering body or cleaning element 12 which is preferably composed of finely divided metal or metallic "wool", or metallic ribbon, and this filtering element 12 is retained in position in the housing 11 by means of retaining screens 41 and 42 (Fig. 1), the screen 41 being retained in position by means of a ring 13 which has an undercut or rabbeted edge 58 (Fig. 1), for a reason to be explained presently, and the screen 42 being retained in position by means of "spider" 43 which extends diametrically across the housing 11 and is braced therein by a rod 44.

The housing or casing 11 has an open end 14 and provided on the casing 11 adjacent the open end 14 thereof is an annular flange 15. Attached to this flange 15 is a closure member or head 16 in which is provided an air inlet 17, and attached to the head 16, adjacent the air inlet 17, is a guard plate 18.

Mounted on the head 16, within the air inlet 17, is a series of air-directing vanes or baffle plates 19; and rotatably mounted, as at 20, in the head 16, immediately behind the air-directing vanes or baffle plates 19, is a rotary member, or rotor 21, which includes a series of radially arranged blades or vanes 22. Certain of these blades 22 have radially outer end portions or scoops 35 and these radially outer end portions or scoops 35 dip successively, when the rotor 21 is revolved, into a liquid or oil well or basin 23 which is formed in the bottom wall of the head 16, a quantity of oil or other suitable filtering liquid or medium being kept in the wall or basin 23. Provided on the axially inner surface of each of the blades 22 are countersunk recesses 45, and extending through each of the blades 22 from the inner ends of the recesses or pockets 45, are openings 50.

The oil well or basin 23 communicates, by way of a conduit or tube 25, with the upper area 26 of an oil reservoir or basin 27 and the oil reservoir or basin 27 communicates by way of openings 51 and 52 which are provided in the bottom of the same, with a sump 28 (Fig. 1).

Leading into the reservoir or basin 26—27 from the housing or casing 11 is an inlet or opening 29.

Mounted in the housing or casing 11 is a substantially frusto-conical or funnel-shaped mixing member 30 which has a flanged portion 31 which is attached to the flange 15 of the casing 11, and provided in the lower wall 46 of this funnel or conical shaped mixing member is an elongated slit or opening 32 (Figs. 1 and 4).

Extending downwardly from the bottom wall 47 of the housing 11 into the opening 51 is a drip plate 54 (Figs. 1 and 5) and extending upwardly from the bottom wall 47 of the funnel-shaped mixing member 30 at the axially inner side of the well 23, is a wall 55 (Figs. 1 and 6).

Leading out of the housing or casing 11, at the end thereof which is opposite the air inlet 17, and arranged adjacent the upper part of the housing 11, is an air outlet 33, the axially inner end of this outlet 33 having an undercut or rabbeted wall 34 (Fig. 1).

The present air or gas filtering or cleaning device is particularly adapted to be used in conjunction with internal combustion engines, air conditioning apparatus, or the like, wherever it may be desired to clean or filter a supply of air or other gas and when the same is in use air or other gas is drawn, by vacuum or suction, into the inlet 17 through the air-directing vanes or baffle plates 19, and is effectively directed by the latter into engagement with the blades 22 of the rotary spraying member or rotor 21, thereby causing the latter to revolve, and thus causing the radially outer end portions or scoops 35 of the blades 22 to move alternately into and out of the liquid well 23. During this movement of the rotor 21 the radially outer end portions or scoops 35 of the blades 22 dip into the liquid well 23 and thus pick up a quantity of the filtering liquid therein and lift the same up out of the well 23 into the cone or funnel-shaped member 30 wherein the filtering or cleaning liquid thus lifted out of the well 23 comes into contact with the air passing into the cone 30 from the air inlet 17.

As the oil or other cleaning liquid is lifted up out of the well 23 by the radially outer end portions 35 of the blades 32 some of the cleaning liquid runs by gravity along the blades 22 into the recesses or pockets 45 and during this operation air entering the housing 11 from the inlet 17 passes through the openings 50 in the blades 22 and thus drives the oil or other cleaning liquid out of the recesses or pockets 45, thus tending to atomize the oil or other cleaning liquid and driving the same thus finely divided into the mixing cone 30.

As the thus finely divided or atomized oil or other cleaning liquid is sprayed into the mixing cone 30 which provides a relatively large surface for mixing the incoming air and foreign particles carried thereby with the cleaning liquid or oil; and during this operation the finely divided oil or other cleaning liquid and air are intimately mixed, thus causing the dust and other foreign particles carried by the incoming air stream to adhere to, and to mix with, the finely divided oil in the mixing cone 30; whereupon the sediment-bearing liquid mixture thus formed travels down the inclined lower wall 46 of the mixing cone 30 and passes through the elongated slot 32 in the latter onto the bottom wall 47 of the housing 11, whence it passes through the opening 29 in the latter, into the receptacle or basin 26. As the sediment bearing cleaning liquid travels down the lower wall 46 of the cone 30 it is prevented by the wall or barrier 55 (Fig. 1) from entering into the well 23 and is thus prevented from polluting the relatively clean liquid therein.

As the sediment-bearing mixture passes through the opening 29 into the basin or receptacle 26, the sediment-bearing and heavier oil or other cleaning liquid engages the drip plate 54 and is guided by the latter through the opening 51, which is formed in the bottom wall 53 of the basin 26, into the sump 28, wherein the relative amount of sediment accumulated may be ascertained by viewing the sight opening or window 48.

Any dust or other foreign particles which are not removed by admixture with the cleaning or filtering liquid sprayed into the mixing cone 30 by the blades 22—35 of the rotor 21, passes through the latter into contact with the finely divided metal or metallic "wool" cleaning element 12 and is therein removed by contact with a relatively large surface area of a fine film of oil or other cleaning liquid which passes through the mixing cone 30, with the incoming air, into contact with the cleaning or filtering element 12; it being understood that the purpose of the cleaning or filtering element 12 is to expose a relatively large surface area to which a film of oil or other cleaning fluid may adhere so that particles of dust and other foreign matter, which are not removed from the air or gas stream as the latter passes through the mixing cone 30, may adhere thereto and be removed thereby. The thus "washed" and filtered air passes out of the filtering or cleaning element 12 into the outlet 33, from which it may be directed into the air inlet of an internal combustion engine or to any other machine, device, or apparatus requiring a supply of filtered air or other gas.

As the sediment-bearing cleaning oil or other liquid passes through the outlet 32 from the mixing cone 30 it collects upon the bottom wall 47 of the housing 11 and eventually passes by way of the opening 29 into the receptacle or basin 26 and the sediment-bearing and heavier oil or other cleaning liquid settles into the bottom portion or sump 28 of the basin 26, while the relatively lighter and cleaner liquid remains at the top of the receptacle or basin 26 from which it is conducted, by gravity, by the inclined conduit or tube 25 into the well 23; it being noted, (Fig. 1) that the tube or conduit 25 is inclined slightly upwardly from the horizontal and that it has an open upper end 56 which opens into the basin 26, adjacent the top of the latter, and that it has an open lower end 57 which opens into the well 23. In this manner an effective separation is effected between the relatively clean liquid, which rises to the top of the basin 26, and the sediment-bearing and heavier liquid, which sinks into the sump 28, so that a supply of the relatively clean liquid is at all times supplied to the well 23, thus assuring that a quantity of the relatively clean fluid is at all times disposed in the well 23 for engagement with the scoop portions 35 of the blades 22—35 of the rotor 21 by which it is sprayed into the mixing cone 30 into contact with the air passing therethrough; it being noted that only certain of the blades 22—23 are provided with the "scoops" 35 so that when these scoops dip into the well 23 they scoop up an excess of oil or other filtering fluid therein and a part of this excess is caught by the other blades of the rotor and is retained in the recesses or pockets 45—50 (Fig. 9) until such time as the blades 22—23 which are provided with these pockets or recesses 45—50 come into contact with the air flowing into the housing through the inlet 17, whereupon the inflowing air, passing through the inlets 50 (Fig. 9) to the recesses 45 (Fig. 9) forces the liquid out of the recesses or pockets 45 into the mixing cone 30 and in so doing atomizes or finely divides the same.

The undercut edge or wall 58 of the retaining ring 13 and the undercut wall 34 of the air outlet 33, together with the position of the air outlet 33 near the top of the housing 11, prevent the cleaning liquid from being sprayed, or passing, through the filter element 12, and out through the outlet 33, since the mouth or smaller end of the mixing cone 30 and the outlet 33 are disposed out of axial alinement with each other, and any liquid which may be sprayed out of the mixing cone 30 into the filter body 12 will engage against the inner wall of the casing 11 and will be prevented by the undercut edges 58 and 34 from passing into the air outlet 33.

Mounted in the head 16 is a deflector rib or plate 24 (Figs. 1 and 3) which is inclined downwardly and outwardly so as to prevent the cleaning or filtering liquid which is carried up out of the well 23 by the blades 22—35 of the rotor 21 from being sprayed out of the head 16 into the air inlet 17 (right to left, Fig. 1) and thence out of the filtering device itself.

The smaller or axially inner end of the mixing cone 30 has a jagged peripheral edge 59 (Figs. 1 and 4) which aids in breaking up the cleaning liquid which passes, in a swirling motion, out of the mixing cone 30 into the filter element 12 and this jagged edge 59 likewise tends to break up the force or pressure of the incoming stream of air and cleaning liquid as the same passes out of the cone 30 against the spider 43 and retaining screen 42, and this acts as a safety device to reduce the effective pressure of the incoming air stream at any one point on the spider 43 and screen 42; it having been found in this connection that if the cone 30 is provided with a relatively straight or smooth inner end the pressure of the inflowing air stream on the screen 42 and filter body 12 becomes so great that it tends to dislodge the filter body 12 from its proper position.

The guard plate 18 prevents a direct flow of air into the inlet 17, and thereby minimizes the amount of foreign matter which may be carried into the casing 11 by way of the inlet 17, and at the same time this plate 18 tends to induce a natural draft or air vacuum through the inlet 17 so as to operate the rotor 21—22—35.

The screens 41 and 42 act to retain the filter body 12 in position and the screen 42 coacts with the "spider" 43 and with the retaining rod 44 to retain the filter element 12 in the casing 11 and against displacement therefrom by back pressure through the outlet 33, which is apt to occur when the device is associated with high pressure gas apparatus, such as an internal combustion engine, wherein the back fire of the engine acting through the outlet 33 would have a tendency to dislodge the filter body 12 from its proper place if it were not for the retaining screens 41 and 42 and the rod 44.

The sump portion 28 of the basin 26 may be removed, when desired, so as to empty out the sediment-bearing cleaning liquid therein by removing the bolts 49 by which the sump 28 is attached to the basin 26.

A modified form of the invention in Figs. 7 and 8, is therein generally indicated at 37, and this form of the invention is substantially similar in construction to the form of the invention shown in Figs. 1 to 4 inclusive, except that this modified form of invention is particularly adapted for use in automative vehicles and other places where the air or other gas supplied to the filtering device must be fed to it by means of a conduit or tube, such as 38; and to this end the air inlet to the filter 37 is provided by a head 39 through which air or other gas may be directed from the conduit or tube 38 into the casing or housing 40 of the filter 37. This form of the invention also employs a different form of receptacle or sump for the sediment-bearing cleaning fluid and the latter has the form of a bowl 60 which may be detachably attached, in any suitable manner, to the basin 61 which is arranged at the bottom of the casing 40.

Otherwise the modified form of the invention, shown in Figs. 7 and 8, is substantially the same as the preferred form of the invention shown in Figs. 1 to 6 inclusive.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

I claim:

1. A gas filtering device, comprising the combination of: a housing including a well adapted to contain a quantity of filtering liquid and said housing having an air inlet and air outlet disposed above the level of said well; a substantially frusto-conical member in said housing between said inlet and said outlet; said substantially frusto-conical member having open ends and having its larger open end directed toward said outlet; a body of relatively finely divided metallic ribbon in the said housing between said substantially frusto-conical member and said outlet; and a rotatable member in said housing between said inlet and said substantially frusto-conical member and including blades or vanes having radially outer end portions or scoops movable into and out of said well and adapted to scoop or convey a quantity of filtering liquid from said well into said substantially frusto-conical member so as to mix the same intimately therein with a stream of air or other gas and foreign particles carried thereby passing through said substantially frusto-conical member from said inlet to said outlet.

2. A gas filtering device, comprising the combination of: a housing including a well adapted to contain a quantity of filtering liquid and said housing having an air inlet and an air outlet disposed above the level of said well; a substantially frusto-conical member in said housing between said inlet and said outlet; said substantially frusto-conical member having open ends and having its larger open end directed toward said inlet and having its smaller open end directed toward said outlet; a body of relatively finely divided metallic ribbon in the said housing between said substantially frusto-conical member and said outlet; and a rotatable member in said housing between said inlet and said substantially frusto-conical member and including blades or vanes having radially outer end portions or scoops movable into and out of said well and adapted to scoop or convey a quantity of filtering liquid from said well into said substantially frusto-conical member so as to mix the same intimately therein with a stream of air or other gas and foreign particles carried thereby passing through said substantially frusto-conical member from said inlet to said outlet; the said radially outer end portions of said blades or vanes having recesses or pockets formed therein on their axially inner sides and having openings extending therethrough from the inner ends of said recesses or pockets to the axially outer sides of said blades.

3. A gas filtering device, comprising the combination of: a housing including a well adapted to contain a quantity of a filtering liquid and said housing having an air inlet and an air outlet disposed above the level of said well; a substantially frusto-conical member in said housing between said inlet and said outlet; said substantially frusto-conical member having open ends and having its smaller open end directed toward said outlet; a body of relatively finely divided metallic ribbon in the said housing between said substantially frusto-conical member and said outlet; and a rotatable member in said housing between said inlet and including blades or vanes having radially outer end portions or scoops movable into and out of said well and adapted to scoop or convey a quantity of filtering liquid from said well into said substantially frusto-conical member so as to mix the same intimately therein with a stream of air or other gas and foreign particles carried thereby passing through said substantially frusto-conical member from said inlet to said outlet; said outlet being disposed above and out of axial alignment with said substantially frusto-conical member.

4. A gas filtering device, comprising the combination of: a housing including a well adapted to contain a quantity of filtering liquid and said housing having an air inlet and an air outlet disposed above the level of said well; a substantially frusto-conical member in said housing between said inlet and said outlet; said substantially frusto-conical member having open ends and having its larger open end directed toward said outlet; a body of a relatively finely divided metallic ribbon in the said housing between said substantially frusto-conical member and said outlet; a rotatable member in said housing between said inlet and said substantially frusto-conical member and including blades or vanes having radially outer end portions or scoops movable into and out of said well and adapted to scoop or convey a quantity of filtering liquid from said well into said substantially frusto-conical member so as to mix the same intimately therein with a stream of air or other gas and foreign particles carried thereby passing through said substantially frusto-conical member from said inlet to said outlet; and a basin or receptacle arranged at the bottom of said housing and said basin having communication with said substantially frusto-conical member by way of said housing so as to receive sediment-bearing liquid therefrom.

5. A gas filtering device, comprising the combination of: a housing including a well adapted to contain a quantity of filtering liquid having an air inlet and an air outlet disposed above the level of said well; a substatially frusto-conical member in said housing between said inlet and said outlet; said substantially frusto-conical member having open ends and having its larger open end directed toward said inlet and having its smaller open end directed toward said outlet; a body of a relatively finely divided metallic ribbon in the said housing between said substantially frusto-conical member and said outlet; a rotatable member in said housing between said inlet and said substantially frusto-conical member and including blades or vanes having radially outer end portions or scoops movable into and out of said well and adapted to convey or scoop a quantity of filtering liquid from said well into said substantially frusto-conical member so as to mix the same intimately therein with a stream of air or other gas and foreign particles carried thereby passing through said substantially frusto-conical member from said inlet to said outlet; a basin or receptacle arranged at the bottom of said housing and said basin having communication with said substantially frusto-conical member by way of said housing so as to receive sediment-bearing liquid therefrom; and a conduit in said basin or receptacle providing communication between the upper area of said basin or receptacle and said well so as to conduct the relatively cleaner and lighter filtering liquid from the upper area of said basin or receptacle into said well.

6. A gas filtering device, comprising the combination of: a housing including a well adapted to contain a quantity of filtering liquid and said housing having an air inlet and an air outlet disposed above the level of said well; a substantially frusto-conical member in said housing between said inlet and said outlet; said substantially frusto-conical member having open ends and having its larger open end directed toward said inlet and having its smaller open end directed toward said outlet; a body of filtering material in the said housing between said substantially frusto-conical member and said outlet; a rotatable member in said housing between said inlet and said substantially frusto-conical member including blades or vanes having radially outer end portions or scoops movable into and out of said well and adapted to scoop or convey a quantity of liquid from said well into said substantially frusto-conical member so as to mix the same intimately therein with a stream of air or other gas and foreign particles carried thereby passing through said substantially frusto-conical member from said inlet to said outlet; and a plurality of vanes in said inlet for directing air or other gas flowing through said inlet against the blades of said rotatable member so as to rotate the latter.

7. A gas filtering device, comprising the combination of: a housing including a well adapted to contain a quantity of filtering liquid and said housing having an air inlet and an air outlet disposed above the level of said well; a substantially frusto-conical member in said housing between said inlet and said outlet; said substantially frusto-conical member having open ends and having its larger open end directed toward said inlet and having its smaller open end directed toward said outlet; a body of filtering material in the said housing between said substantially frusto-conical member and said outlet; and a rotatable member in said housing between said inlet and said substantially frusto-conical member and including blades or vanes having radially outer end portions or scoops movable into and out of said well and adapted to scoop or convey a quantity of liquid from said well into said substantially frusto-conical member so as to mix the same intimately therein with a stream of air or other gas and foreign particles carried thereby passing through said substantially frusto-conical member from said inlet to said outlet; said substantially frusto-conical member having a jagged marginal edge portion defining its said smaller open end.

8. A gas filtering device, comprising the combination of: a housing including a well adapted to contain a quantity of filtering liquid and said housing having an air inlet and an air outlet disposed above the level of said well; a substantially frusto-conical member in said housing between said inlet and said outlet; said substantially frusto-conical member having open ends and having its larger open end directed toward said inlet and having its smaller open end directed toward said outlet; a body of filtering material in the said housing between said substantially frusto-conical member and said outlet; a rotatable member in said housing between said inlet and said substantially frusto-conical member and including blades or vanes having radially outer end portions or scoops movable into and out of said well and adapted to scoop or convey a quantity of liquid from said well into said substantially frusto-conical member so as to mix the same intimately therein with a stream of air or other gas and foreign particles carried thereby passing through said substantially frusto-conical member from said inlet to said outlet; said substantially frusto-conical member including a lower wall having an opening formed therein adapted to enable sediment-bearing filtering liquid to pass therethrough by gravity onto the bottom of said housing; and a basin or receptacle at the bottom of said housing and having communication therewith for receiving the sediment-bearing filtering liquid which passes through the said opening in the lower wall of said substantially frusto-conical member.

RICHARD R. HALSTEAD.